Patented July 15, 1941

2,249,527

UNITED STATES PATENT OFFICE 2,249,527

MANUFACTURE OF ANHYDRIDES OF ALIPHATIC ACIDS

David C. Hull, Kingsport, Tenn., assignor to Eastman Kodak Company, Rochester, N. Y., a corporation of New Jersey No Drawing. Application January 21, 1938, Serial No. 186,141

7 Claims. (Cl. 260—546)

This invention relates to the manufacture of anhydrides of aliphatic acids and more particularly to the manufacture of acetic anhydride by the pyrolysis of acetic acid.

Aliphatic anhydrides and in particular acetic anhydride are chemical compounds which are used extensively in the industry. For example, these compounds are employed in the manufacture of various esters and for other purposes. A number of methods for manufacturing anhydrides have been suggested.

A large number of processes have been directed to the pyrolysis of acetic acid in the presence of a catalyst to obtain a reaction mixture containing anhydride. The anhydride would be condensed and recovered directly from the condensed mixture. More recent processes have been directed to the pyrolysis of acetic acid under reduced pressure to produce ketene. The water and other components would be separated from the ketene. Separated ketene would then be reacted with further acid for producing anhydride. In view of the demand and many uses for aliphatic acid anhydrides, it is apparent that new and improved processes have distinct value.

I have discovered a new process for the manufacture of aliphatic acid anhydrides which is a marked improvement over the first-mentioned type of process in yields and other features. My novel process also may be considered an improvement in certain features, as well as clearly distinguishable, from the second or reduced pressure type process.

This invention has for one object to provide a process for the manufacture of anhydrides of the lower aliphatic acids. Another object is to provide a process particularly adapted for the production of acetic anhydride. Still another object is to provide an anhydride process which includes the pyrolysis of acetic acid and treatment of the reaction mixture under controlled conditions. Still another object is to provide a pyrolysis process which may be conducted under normal atmospheric conditions. A still further object is to provide a process for pyrolyzing acetic acid and obtaining acetic anhydride in improved yields. A still further object is to provide a process of obtaining aliphatic acid anhydrides from aliphatic acids in improved yields without substantially increased requirements of labor, catalyst, heating or other factors. A still further object is to provide an improved process for the manufacture of acetic anhydride which may in a number of instances be readily applied to existing set-ups and increase their capacity. Other objects will appear hereinafter.

I have found that for optimum results there is a definite relationship which should be obtained in the anhydride-acid-water reaction mixture prior to separation thereof. In carrying out my process any conventional apparatus may be employed. Preferably, this apparatus would include a vaporizer, preheater, pyrolysis chamber, condensers and vacuum distillation column. The apparatus would be provided with suitable means for feeding catalyst, and other such devices.

The acetic acid or other aliphatic acid would be vaporized, preheated, and then pyrolyzed at a temperature preferably between 500° C.–1000° C. The pyrolysis would be carried out in the presence of any of the various catalysts such as the esters of phosphoric acid, the various borates, tungstates, or other such substances which are employed in the production of anhydride. Also, ammonia, amines, or other such agents, may be added after the pyrolysis, during cooling or other points in my process. My process may be conducted under normal atmospheric pressure. However, if desired, reduced pressure or positive pressure may be employed for causing a well-defined flow of acid through the apparatus.

In my process it is unnecessary to separate the water from the reaction mixture immediately after the reaction mixture issues from the pyrolysis apparatus. At this point in the process either before or after cooling, a predetermined amount of acid would be added to the reaction mixture. This amount of acid is generally less than one time as much as fed to the furnace. The acid added produces an anhydride content between approximately 40–45%.

This mixture of anhydride, in an amount less than 45%, water, acid, and the various gases therewith, is then subjected to vacuum distillation for recovering acetic anhydride. I find that by my process improved yields are obtained by virtue of maintaining the particular ratio in the reaction mixture, together with the other features set forth.

I have found that when the reaction mixture which is treated in the vacuum still contains more than 45% anhydride, the amount of tar and waste gas formed, the amount of unsaturated products carried away by the waste gas and other such effects are greatly increased. It is also noticed that the amount of anhydride lost by recombination during the separation step becomes greater.

So, if a cracked product of, for example 55% anhydride were produced, there would not be enough acid in the acid-water-anhydride mixture to most efficiently carry the water away from the anhydride even though 100% anhydride were left in the base of the still. Thus, it might appear that it would be desirable to limit conversion to 45% anhydride as a maximum.

I have found, however, that it is not necessary to so limit the conversion and that the yield of the process may be increased considerably by introducing a supply of acid after the pyrolysis treatment. The acid should be sufficient to maintain the product at 40-45% anhydride content, even though the temperature, quantity of catalyst and other factors are regulated so that a product of 55%-65% would normally be produced.

For example, if 500 lbs. of acid were pyrolyzed to anhydride or materials capable of yielding anhydride, there would be obtained 500 lbs. of cracked product. Assuming that this product was comprised of 45% anhydride, there would be 225 lbs. of 100% anhydride. If 200 lbs. of acid were added after the pyrolysis treatment to give 700 lbs. of 40% anhydride, the anhydride produced is then approximately 280 lbs. This represents an increase of approximately 25%.

The aforementioned values have been set forth primarily for illustration and it is to be understood that my invention is not limited thereto.

The auxiliary supply of acid above described may be added at a number of points in the system. The acid might be added immediately after the pyrolysis treatment, immediately before the primary cooler, in the primary cooler, or after the primary cooler. Or, in the event that a plurality of coolers or condensers have been employed, the auxiliary acid supply might be added before the secondary cooler. I prefer to add the acid in the vapor line somewhere after the primary cooler. Since the quantity of acid added is not sufficient to exert a material cooling effect, there is no particular advantage in adding the acid before the cooler. However, it is to be understood that my invention is not limited in this respect.

This auxiliary acid supply may be introduced as a liquid spray, vapor spray or by adding the liquid through a pipe in such a manner that the incoming vapors from the pyrolysis reaction vaporize the liquid before it reaches the outlet end of the pipe. By these procedures the acid is thoroughly mixed with the anhydride containing product.

The advantages of this novel procedure are quite evident. It is apparent from the preceding example that by using the same amount of steam for vaporization, thermal energy for heating, catalyst and labor, that an increase of capacity of 25% or more (based on anhydride produced) may be had. It is further understood that this procedure for separating the anhydride as a mixture containing 40-45% anhydride is not limited to the exact process described. My invention may be applied to the separation of various mixtures of acetic anhydride in the presence of acetic acid and water.

My process is susceptible of certain modifications. While I have described in particular the pyrolysis of glacial acetic acid, because this represents my preferred embodiment, my invention embraces other modifications. It is also possible to similarly pyrolyze dilute acetic acid, or the various other lower aliphatic acids, such as propionic and butyric acids. As indicated, the pyrolysis may be carried out in metal chambers constructed of chrome aluminum steel or the like. The vaporizers and preheaters may be conconstructed of commercial stainless steel. Various temperatures, pressures and catalysts may be employed. Hence, I do not wish to be restricted in my invention, excepting insofar as necessitated by the prior art and the spirit of the appended claims.

What I claim is:

1. A process for the production of acetic anhydride, which comprises obtaining a mixture having a content of acetic anhydride greater than 45% by thermally decomposing acetic acid at a temperature between 500° C.-1000° C. in the presence of an anhydride forming catalyst, together with the gases from the pyrolysis treatment, diluting the mixture with sufficient acetic acid to obtain a mixture having an acetic anhydride content between 40-45% and subjecting this latter mixture to vacuum distillation for recovering the anhydride.

2. A process for the manufacture of acetic anhydride, which comprises producing by the pyrolysis of acetic acid at a temperature between 500° C.-1000° C. under approximately normal pressure in the presence of an anhydride forming catalyst, reaction materials capable of yielding upon condensation, a mixture having more than 45% anhydride therein, cooling said materials, disseminating acetic acid in a finely divided condition into said cooled materials so as to become intimately mixed therewith, said acetic acid being sufficient to produce a mixture having an acetic anhydride content between approximately 40-45%, and recovering the acetic anhydride from this mixture by distillation.

3. A process for the manufacture of acetic anhydride, which comprises producing reaction materials having a combined acetic anhydride and ketene content capable of yielding, by reaction with acetic acid, a reaction mixture having more than 45% anhydride, treating said ketene with sufficient re-agent not only to convert the ketene to anhydride, but to produce a reaction mixture with a content of anhydride between about 40%-45%, and subjecting this latter mixture to distillation under reduced pressure for recovering the anhydride.

4. A process for the manufacture of acetic anhydride, which comprises feeding acetic acid to a pyrolysis apparatus in a quantity of several hundred pounds, thermally decomposing the acid to produce a reaction mixture containing a substantial content of acetic anhydride together with components reactive with acetic acid, which reaction mixture would yield upon condensation a condensate having greater than 45% acetic anhydride, cooling the mixture sufficiently quickly and to a temperature below 100° C., whereby losses of anhydride are reduced, distilling the mixture for separating anhydride and prior to said distillation, feeding acetic acid into the reaction mixture in a quantity not greater than the aforementioned quantity.

5. A process for the manufacture of acetic anhydride, which comprises producing by the pyrolysis of acetic acid, reaction materials capable of yielding a mixture having more than 45% anhydride therein, cooling said materials, spraying acetic acid into said cooled materials so as to become intimately mixed therewith, said acetic acid being sufficient to produce a mixture having an acetic anhydride content between approximately 40–45%, and recovering the acetic anhydride from this mixture by distillation.

6. A process for the manufacture of acetic anhydride, which comprises producing by the pyrolysis of acetic acid, reaction materials capable of yielding a mixture having more than 45% anhydride therein, partly cooling said materials in a conduit, contacting liquid acetic acid with the materials in such a manner that the liquid acetic acid vaporizes before flowing to the end of the conduit and thereby becomes intimately mixed with the reaction materials, said acetic acid being sufficient to produce a resultant mixture having an acetic anhydride content between 40–45%, and recovering the acetic anhydride from this mixture by vacuum distillation.

7. A process for the manufacture of anhydrides by the pyrolysis of lower aliphatic acids, which comprises feeding several hundred pounds of a lower aliphatic acid to a pyrolysis treatment, pyrolyzing the acid at a temperature between 500–1000° C. in the presence of an anhydride forming catalyst, withdrawing the reaction mixture for subjection to distillation under reduced pressure but prior to said distillation, introducing into the reaction mixture a quantity of aliphatic acid and not greater than the quantity fed in producing the reaction mixture, and subjecting the resultant mixture of anhydride and acid to said distillation under reduced pressure.

DAVID C. HULL.